United States Patent [19]

Schieke et al.

[11] Patent Number: 5,998,980
[45] Date of Patent: Dec. 7, 1999

[54] HIGHLY EFFICIENT MULTI-FREQUENCY VOLTAGE REGULATING CIRCUIT INCORPORATING A MAGNETIC FIELD POWER SENSOR AND PROGRAMMABLE MAGNETIC FIELD DETECTION

[75] Inventors: Pieter Schieke, Phoenix; Willem Smit, Chandler, both of Ariz.

[73] Assignee: Microchip Technology Incorporated, Chandler, Ariz.

[21] Appl. No.: 09/061,529

[22] Filed: Apr. 16, 1998

[51] Int. Cl.$^6$ .............................. G05F 1/569; G01N 27/72
[52] U.S. Cl. .............................................. 323/276; 324/200
[58] Field of Search ...................................... 323/274, 275, 323/276, 277, 911; 363/50, 52, 55, 56; 324/200, 225, 117 R

[56] References Cited

U.S. PATENT DOCUMENTS

4,070,699  1/1978  Einbinder ............................... 363/55 X
4,752,733  6/1988  Petr et al. ................................. 324/225
5,662,694  9/1997  Lidman et al. ............................ 607/60

*Primary Examiner*—Y. J. Han
*Attorney, Agent, or Firm*—Paul N. Katz; Ronald L. Chichester; Frohwitter

[57] ABSTRACT

The highly efficient multi-frequency voltage regulating circuit is capable of converting magnetic field energy to electrical energy for charging either a battery or an energy storage device such as a capacitor. The invention provides a magnetic field sensor circuit that measures the strength of incoming magnetic field energy with respect to a reference current. The invention also provides for a programmable magnetic field detection circuit which is used to adjust the detection level of the inductor-capacitor magnetic field converter circuit. A discharge expediter circuit is provided to improve the efficiency of the magnetic field converter circuit by discharging excess energy.

26 Claims, 6 Drawing Sheets

FIG. 8

HIGHLY EFFICIENT MULTI-FREQUENCY VOLTAGE REGULATING CIRCUIT INCORPORATING A MAGNETIC FIELD POWER SENSOR AND PROGRAMMABLE MAGNETIC FIELD DETECTION

RELATED APPLICATIONS

This U.S. Patent Application is related to U.S. patent application entitled "A ROBUST LC FULL-WAVE BRIDGE RECTIFIER INPUT STRUCTURE," Ser. No. 09/007,485 and a filing date of Jan. 15, 1998, in the name of Pieter Schieke was assigned to the same assignee as the present U.S. Patent Application, and is incorporated by reference.

BACKGROUND OF THE INVENTION

1. Field of the Invention

This invention relates generally to devices which convert magnetic field energy to regulated electrical energy. Specifically, the present invention regulates direct current electrical energy which has been converted from magnetic field energy, measures the strength of the incoming magnetic field energy, adjusts the detection level of the incoming magnetic field and discharges excess energy from the magnetic field converter circuitry.

2. Description of the Prior Art

Electrical current rectification circuits and voltage regulator circuits are well known to those skilled in the art of electronic design. To a lesser extent, electronic circuits which convert magnetic field energy to electrical energy, then subsequently rectify and regulate the resulting direct current voltage are also known. The problem not previously addressed by prior art is the ability of an electronic circuit to determine the strength of an incoming magnetic field as measured by electrical power for the purpose of enhancing electromagnetic communication between devices.

The present invention has the ability to determine the strength of an incoming magnetic field as measured by electrical power, to adjust the detection level of the input converter circuitry and discharge excess energy based on the measured magnetic field strength and to interpret changes in the measured magnetic field strength as a method for communicating digital data.

SUMMARY OF THE INVENTION

It is an object of the present invention to provide an electrical circuit which can measure the strength of the incoming magnetic field energy.

It is another object of the present invention to use the incoming magnetic field energy measurement to program the detection level of the programmable magnetic field detection circuit.

It is still another object of the present invention to measure incoming magnetic field energy variations for the purpose of receiving digital data from a magnetic field transmitter.

In accordance with one embodiment of the present invention, a highly efficient multi-frequency voltage regulating circuit is disclosed which comprises a magnetic field power sensor circuit, a programmable magnetic field detection circuit coupled to the magnetic field power sensor circuit, a discharge expediter circuit coupled to the programmable magnetic field detection circuit, a magnetic field converter circuit coupled to the discharge expediter circuit, a rectifier circuit coupled to the magnetic field converter circuit, a voltage clamping circuit coupled to the magnetic field power sensor circuit, and a charging circuit coupled to the voltage clamping circuit.

In accordance with another embodiment of the present invention, a highly efficient multi-frequency voltage regulating circuit is disclosed where the programmable magnetic field detection circuit may be controlled by an analog reference current.

In accordance with another embodiment of the present invention, a highly efficient multi-frequency voltage regulating circuit is disclosed where the programmable magnetic field detection circuit may be controlled by selection of a discrete reference current.

In accordance with another embodiment of the present invention, a highly efficient multi-frequency regulating circuit is disclosed where the selection of a particular discharge path within the discharge expediter circuit is programmable.

In accordance with another embodiment of the present invention, a highly efficient multi-frequency voltage regulating circuit is disclosed which comprises a magnetic field power sensor circuit that measures incoming magnetic field energy variations for the purpose of communicating digital data over a magnetic field.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
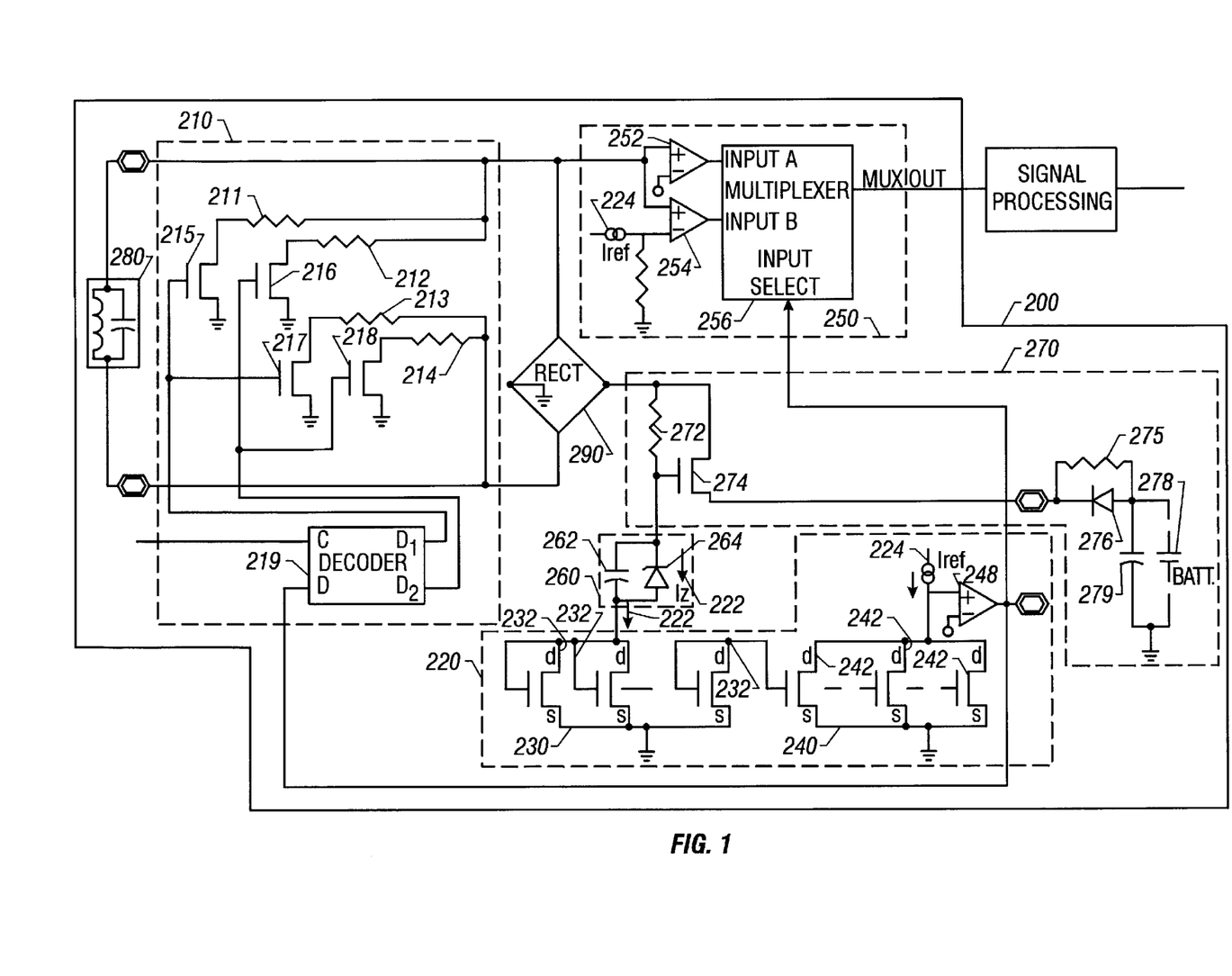
FIG. 1 is an electrical schematic of a magnetic field converter circuit, a discharge expediter circuit, a rectifier circuit, a magnetic field power sensor circuit, a programmable magnetic field detection circuit, a voltage clamping circuit, and charging circuit.

Referring to FIG. 1, a highly efficient multi-frequency voltage regulating circuit 100 is disclosed which comprises a magnetic field power sensor circuit 120, a programmable magnetic field detection circuit 150 coupled to the magnetic field power sensor circuit 120, a discharge expediter circuit 110 coupled to the programmable magnetic field detection circuit 150, a magnetic field converter circuit 180 coupled to the discharge expediter circuit 110, a rectifier circuit 190 coupled to the magnetic field converter circuit 180, a voltage clamping circuit 160 coupled to the magnetic field power sensor circuit 120, and a charging circuit 170 coupled to the voltage clamping circuit 160 for charging a battery and an energy storage device. The LC magnetic field converter circuit 180 and the rectifier circuit 190 are described in copending U.S. patent application entitled "A ROBUST LC FULL-WAVE BRIDGE RECTIFIER INPUT STRUCTURE," Ser. No. 09/007,485 and a filing date of Jan. 15, 1998, and is incorporated by reference as noted above under "Related Applications".

The clamping circuit 160 is a simple capacitor 162 coupled in parallel to a zener diode 164 and is well known to those skilled in the art. The charging circuit 170 is comprised of a biasing resistor 172 coupled to the gate connector of a NMOS FET switch 174, a diode 176 and resistor 175 in parallel coupled to a source connector of the NMOS FET transistor switch 174, a battery 178 coupled to the diode 176 and resistor 175, and a energy storage device 179 coupled to the diode 176 and resistor 175. The charging circuit 170 permits charging of the energy storage device 179 and recharging of the battery 178. The charging circuit 170 has also been disclosed by prior art.

The magnetic field power sensor circuit 120 provides the capability of determining the strength of the incoming electromagnetic field. The magnetic field power sensor circuit is comprised of an input current ($I_Z$) 122, an input current divider circuit 130 coupled to $I_Z$ 122, an input current multiplier circuit 140 coupled to the input current divider circuit 130, a reference current ($I_{REF}$) 124 coupled to the input current multiplier circuit 140, and a comparator 148 coupled to the input current multiplier circuit 140. $I_Z$ 122 is the same as the output current of the clamping circuit 160. $I_{REF}$ 124 is generated external to the present invention.

The purpose of $I_{REF}$ 124 is to establish an equilibrium point at the negative node of the comparator 148. The positive node of the comparator is coupled to a bias voltage. Disregarding the input current divider circuit 130 and the input current multiplier circuit 140 for a moment, if $I_Z$ 122 is less than $I_{REF}$ 124, the output of the comparator will be 0. However, if $I_Z$ 122 is larger than $I_{REF}$ 124, the comparator 148 will give a positive output which yields two results. First, a positive output of the comparator 148 indicates that the rectified voltage is above the breakdown voltage of the zener diode 164. Second, the incoming magnetic signal has enough power to subsequently maintain an input current through the zener diode 164. Thus, the positive output of the comparator 148, which is reached only when $I_Z$ becomes greater than $I_{REF}$, enables the determination of whether a certain induced voltage level has been exceeded and what nominal power level is present in the electromagnetic field received by the voltage regulating circuit 100.

The operation of the input current divider circuit 130 and the input current multiplier circuit 140 is described. The purpose of the current divider and multiplier circuits (130 & 140) is to have $I_Z$ mirror $I_{REF}$ by a combination of the divider circuit 130, which effectively reduces $I_Z$, and the multiplier circuit 140, which effectively increases $I_Z$. Thus, by having two circuits which in combination permit $I_Z$ to mirror $I_{REF}$, the equilibrium point at the negative node of the comparator 148 is evaluated with respect to variations in $I_Z$ and thus to incoming magnetic field strength.

First, the effects of the input current divider circuit 130 are considered on the current equilibrium point at the negative node of the comparator 148. The input current divider circuit 130 is comprised of at least one NMOS transistor 132. The at least one NMOS transistor 132 is configured such that the gate and drain connectors of each of the at least one NMOS transistors 132 is coupled to the input current 122. Furthermore, the source connectors of each of the at least one NMOS transistors 132 are coupled to a ground reference. The effect of this input current divider circuit 130 is to mirror an $I_Z$ that is divided by the number of NMOS transistors 132 in the circuit.

For example, suppose there were two transistor as part of the input current divider circuit 130 and $I_{REF}$ 124 were set at 10 uA, the zener diode breakdown voltage is 5 volts, the threshold voltage of the input current divider circuit 130 is 0.7 volts and the magnetic field power is increased until the output of the comparator 148 becomes positive. The power of the magnetic field signal=(10 uA * 5.7 volts)/2=28.5 uW and $I_Z$=5 uA(=10 uA/2).

Next the effects of the input current multiplier circuit 140 are considered on the current equilibrium point at the negative node of the comparator 148. The input current multiplier circuit 140 is comprised of a second at least one NMOS transistor 142. The second at least one NMOS transistor 142 is configured such that the gate connectors of each of the second at least one NMOS transistors 142 are coupled to $I_Z$ 122 and the input current divider circuit 130. The second at least one NMOS transistor 142 is further configured such that the drain connectors of each of the second at least one NMOS transistors 142 are coupled to the reference current 124 and also to the negative node of the comparator 148. Lastly, the second at least one NMOS transistor 142 is configured such that the source connectors of each of the second at least one NMOS transistors 142 are coupled to a ground reference. The effect of this input current multiplier circuit 140 is to multiply $I_Z$ by the number of NMOS transistors 142 in the circuit.

For example, suppose there were three transistor as part of the input current multiplier circuit 140, $I_{REF}$ 124 was set at 10 uA, the zener diode breakdown voltage is 5 volts, the threshold voltage of the input current multiplier circuit 140 is 0.7 volts and the magnetic field power is increased until the output of the comparator 148 becomes positive. Then the power of the magnetic signal=(10 uA * 5.7 volts)*3=171 uW and $I_Z$=30 uA(=10 uA * 3).

In summary, the input current 122 is mirrored by a factor of 1/m for the input current divider circuit 130 and by a factor of n for the input current multiplier circuit 140. Where m equals the number of NMOS transistors in the input current divider circuit 130 and n equals the number of NMOS transistors in the input current multiplier circuit 140. The ratio of m:n is defined as the current mirror ratio. Thus, the power of the incoming magnetic field can be determined at the point that the output of the comparator transitions from low to high by varying $I_{REF}$ 124, the current mirror ratio and/or the zener diode 164 breakdown voltage.

Throughout this specification reference is made to a magnetic filed sensor circuit 120 comprised of NMOS FETs, which reflects the preferred embodiment. However, those skilled in the art will recognize that PMOS or CMOS FETs may be implemented with minor modification to the circuit to acheive substantially, if not identical, results.

The programmable magnetic field detection circuit 150 permits the screening of incoming magnetic field energy by the adjustment of comparator bias voltage. Thus, only magnetic field induced voltage signals that meet or exceed bias voltages will be processed.

The programmable magnetic field detection circuit 150 is comprised of at least two comparators 152 & 154 and a multiplexer 156. In one embodiment, the output of the LC magnetic field converter circuit 180 is connected to each of the positive nodes of the comparators 152 & 154. The negative node of one comparator 152 is connected to a bias voltage. The negative node of the second comparator 154 is connected to the voltage induced by $I_{REF}$ 124. The outputs of the comparators 152 & 154 are connected to the inputs of the multiplexer 156. The output of the comparator 148 of the magnetic field sensor circuit 120 is connected to the input select for the multiplexer 156. The output of the multiplexer 156 is connected to logic beyond the scope of the present invention such as signal processing.

The programmable magnetic field detection circuit 150 operates as follows. The biasing voltage for the first comparator 152 is typically set at a threshold level to allow the output of the LC magnetic field converter circuit 180 to pass through the first comparator 152 to an input of the multiplexer 156. The biasing voltage for the second comparator 154 is set to the corresponding voltage for the reference current 124. Only incoming magnetic field signals with an amplitude that exceeds that of the voltage induced by $I_{REF}$ 124 will pass through the second comparator 154.

The output of the comparator 148 of the magnetic field sensor circuit 120 is connected to the input select of the multiplexer 156. In a typical application, the output of the comparator 148 is interpreted by the multiplexer 156 to select the output of either the first comparator 152 or the second comparator 154. Thus, the sensitivity of the circuit 150 is adjustable by varying the amplitude of the reference current 124 and the selection of the second comparator 154 by the output of the magnetic field sensor circuit 120.

Described above is a programmable magnetic field detection circuit 150 which is comprised of two comparators 152 & 154. Those skilled in the art will recognize that the present invention is not limited to two comparators. Additional comparators can be incorporated into the programmable magnetic field detection circuit 150 to allow for greater flexibility. Similarly, the multiplexer 156 which is disclosed as having two inputs may also be expanded to include additional inputs.

The amplitude of the reference current may be varied by analog means such as a sinusoidal, triangle, sawtooth or other known wave generators. Furthermore, the amplitude of the reference current may be varied by discrete means well known to those skilled in the art. For example, selection logic can be incorporated into the present invention to select as between a plurality of available discrete reference currents. This selection may be accomplished either dynamically or may be preset.

The discharge expediter circuit 110 provides a programmable discharge path for excess energy stored by the magnetic field converter circuit 180. In the preferred embodiment, the discharge expediter circuit 110 is comprised of a decoder 119 and four discharge paths, i.e. two discharge paths for each node of the magnetic field converter circuit 180. However, those skilled in the art will recognize that the present invention is not limited to four discharge paths.

The first pair of discharge paths are connected to a first common node of the magnetic field converter circuit 180. The first discharge path is formed by the combination of resistor 111 and transistor 115. The second discharge path is formed by the combination of resistor 112 and transistor 116. In the preferred embodiment, the impedance value of resistor 111 is distinct from the impedance value of resistor 112. As those skilled in the art will recognize, the discharge paths can be designed to operate efficiently with magnetic fields of varying strengths by having resistors with unique impedance values to control the rate of discharge.

The second pair of discharge paths are connected to a second common node of the magnetic field converter circuit 180. The third discharge path is formed by the combination of resistor 113 and transistor 117. The fourth discharge path is formed by the combination of resistor 114 and transistor 118. In the preferred embodiment, the impedance value of resistor 113 approximates that of resistor 111 and the impedance value of resistor 114 approximates that of resistor 112. Efficiency is enhanced by matching the impedance values of analogous discharge paths for each node of the magnetic field converter circuit 180.

The decoder 119 activates the selected discharge path(s). The C (control) input to the decoder 119 is coupled to a programming source that is beyond the scope of the present invention. The D (decode) input to the decoder 119 is coupled to the data source to be decoded. In the preferred embodiment, the D input is coupled to the output of the comparator 148. The $O_1$ output of the decoder 119 is coupled to the control electrodes of the transistors 115 & 117. The $O_2$ output of the decoder 119 is coupled to the control electrodes of the transistors 116 & 118. Thus, by programmably asserting a specific output of the decoder 119, discharge paths with common characteristics are selected for each of the two nodes of the magnetic field converter circuit 180.

The selected discharge path permits discharge of pent up energy in the magnetic field converter circuit 180. Those skilled in the art will recognize that certain impedance values of the resistors 111, 112, 113 & 114 will optimize the efficiency of the discharge paths for specific magnetic field strengths.

Figure 2A:
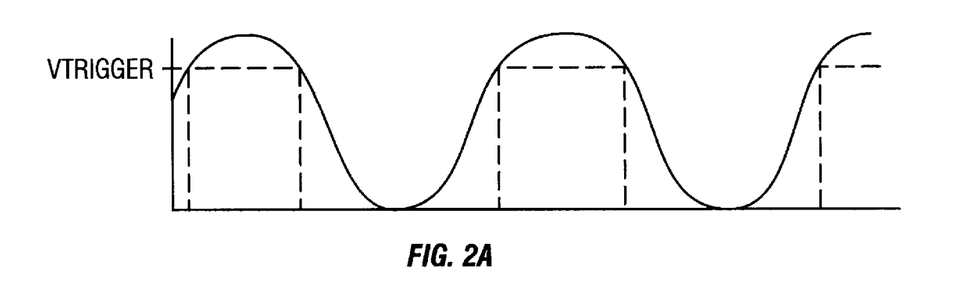
FIG. 2A is a waveform diagram of a typical sinusoidal waveform as seen by the LC magnetic field converter circuit.
Figure 2B:
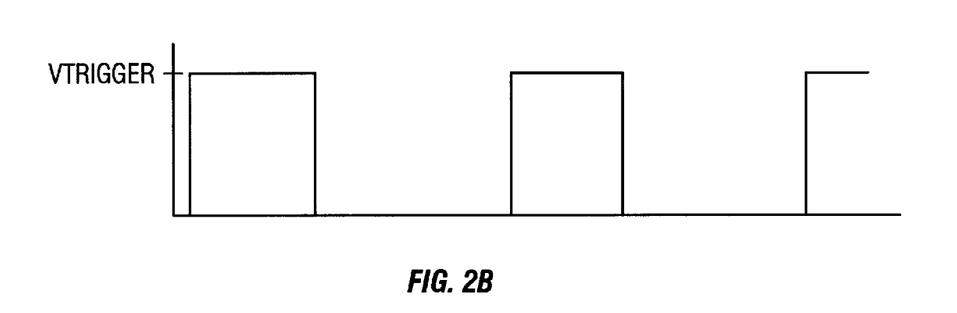
FIG. 2B is a waveform diagram of the digital output of the magnetic field power sensor circuit for the sinusoidal waveform of FIG. 2A.
Figure 2C:
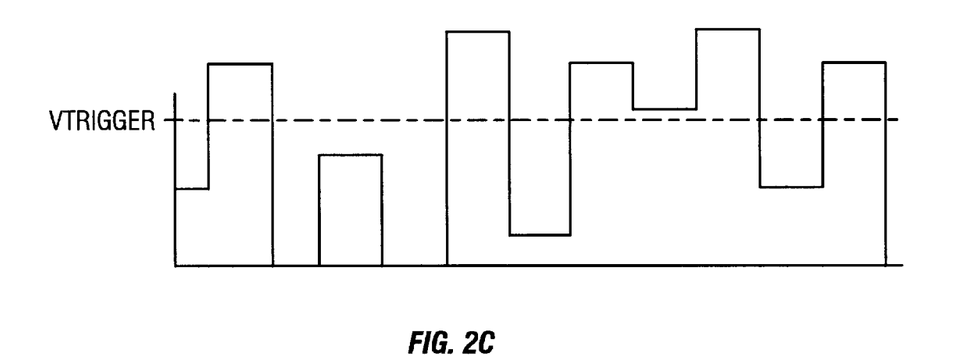
FIG. 2C is a waveform diagram of a pulse waveform of varying amplitudes as seen by the LC magnetic field converter circuit.
Figure 2D:
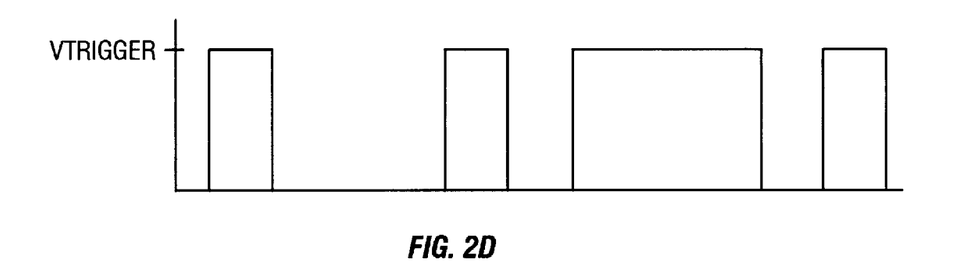
FIG. 2D is a waveform diagram of the digital output of the magnetic field power sensor circuit for the pulse waveform of FIG. 2C.
Figure 3:
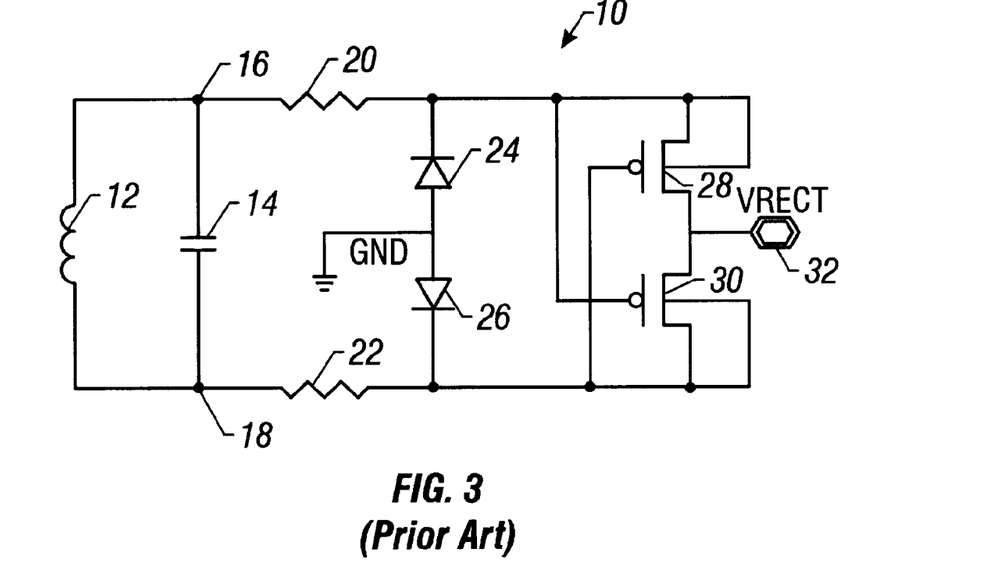
Figure 4:
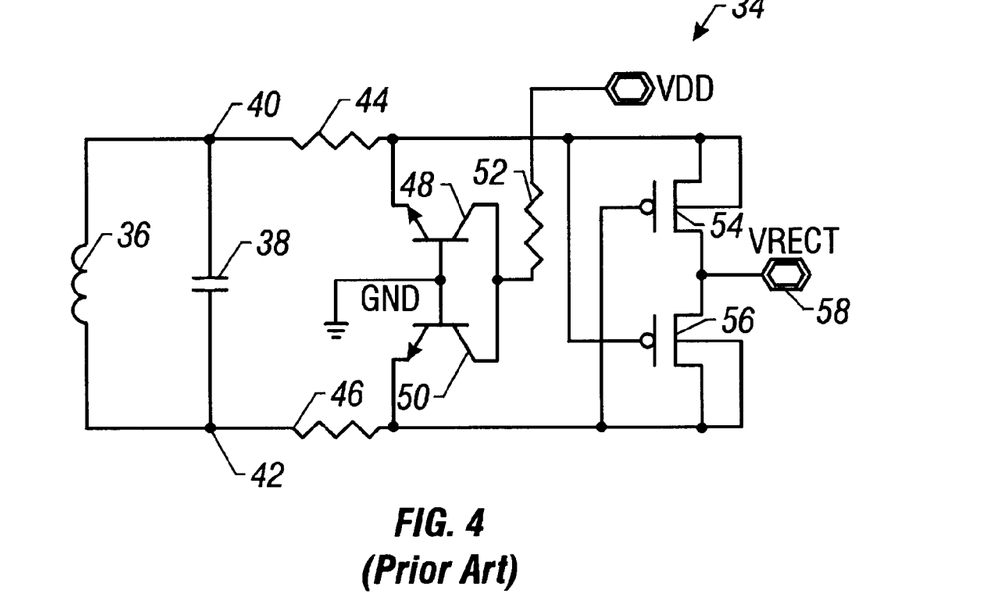
Figure 5:
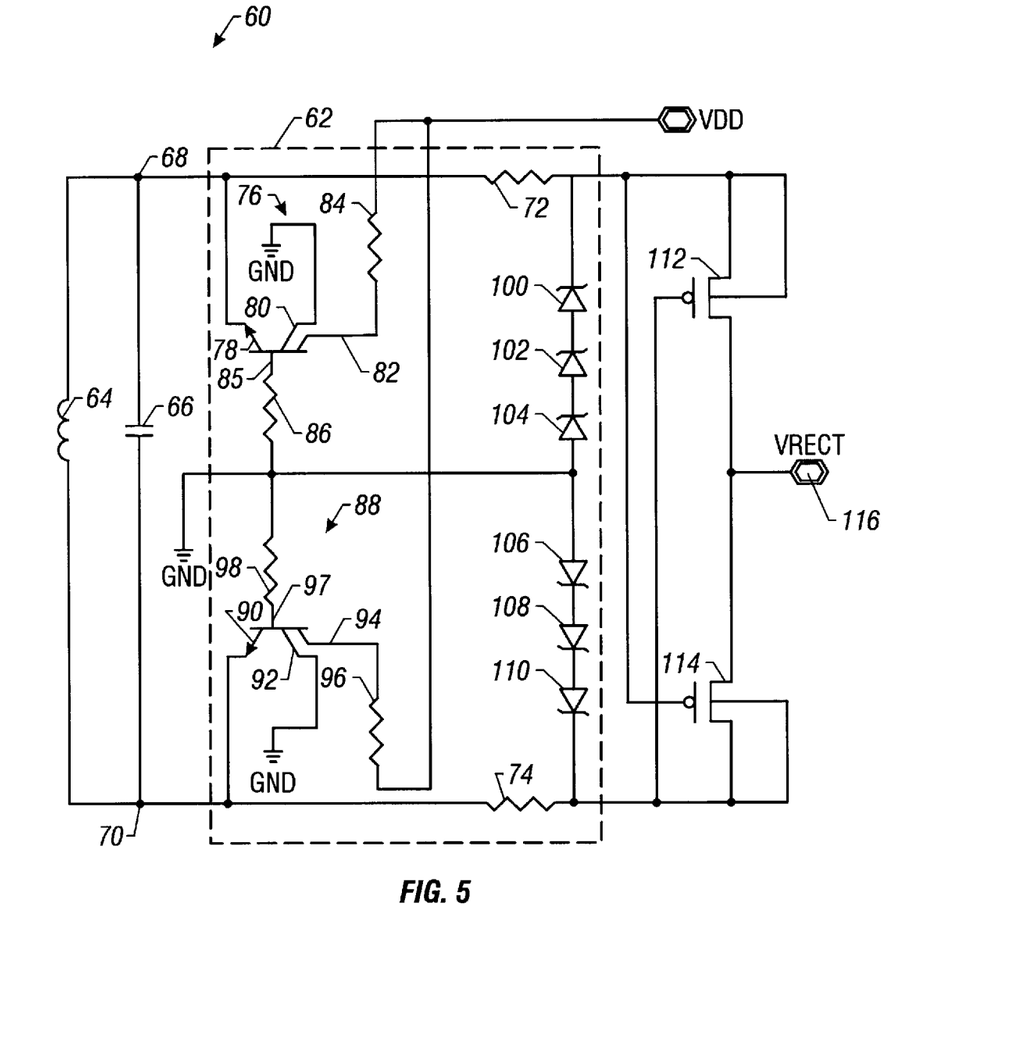
Figure 6:
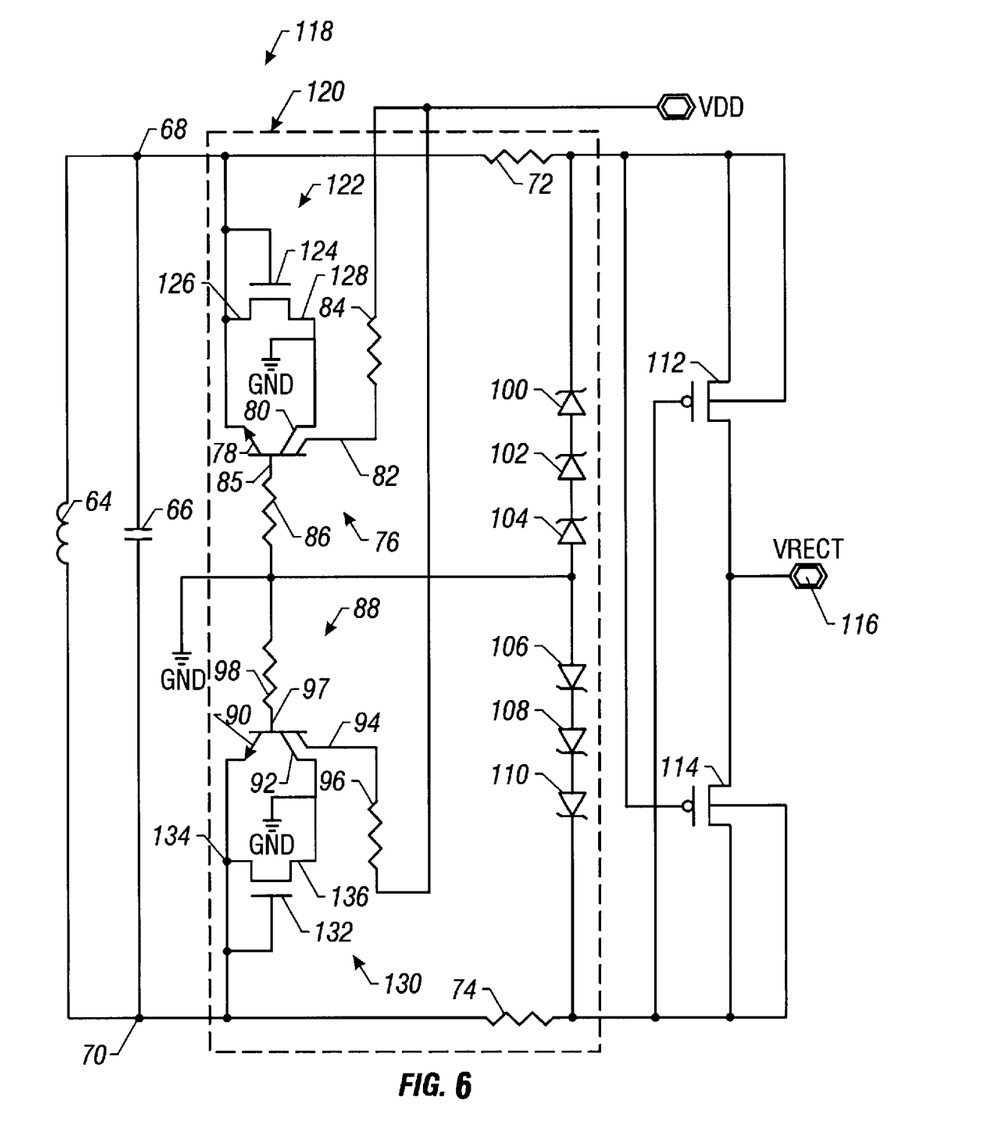
Figure 7:
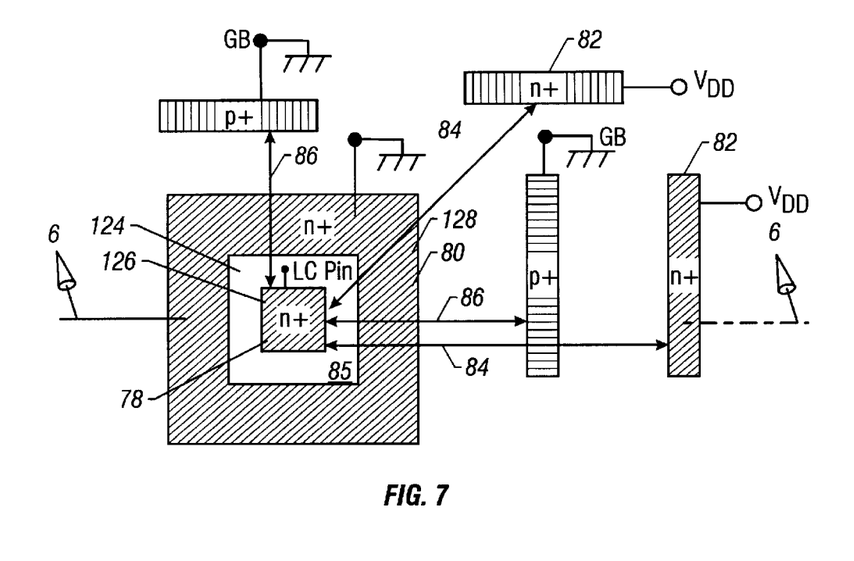

Referring to FIGS. 2A–2D, waveform diagrams of the conversion of the incoming magnetic field to digital data are disclosed for the purpose of illustrating digital communication over a magnetic field. For all the diagrams, the abscissa is time and the ordinate is power. Two variations of an incoming magnetic field waveforms are shown. FIG. 2A reflects a typical sinusoidal waveform as seen by the LC magnetic field converter circuit 180 (FIG. 1). FIG. 2B reflects the digital output of the comparator 148 (FIG. 1) for the sinusoidal waveform of FIG. 2A. FIG. 2C reflects a pulse waveform with varying amplitudes at the LC magnetic field converter circuit 180 (FIG. 1). FIG. 2D reflects the digital output of the comparator 148 (FIG. 1) for the pulse waveform of FIG. 2C. Those skilled in the art will note that the trigger point for the digital output of the comparator 148 is determined by the power of the incoming magnetic signal and the parameters described for the voltage regulating circuit 100 (FIG. 1). Those skilled in the art will further note that the digital output of the comparator 148 can be used to receive digital communication from a magnetic transmitter.

Although the invention has been particularly shown and described with reference to a preferred embodiment thereof, it will be understood by those skilled in the art that changes in form and detail may be made therein without departing from the spirit and scope of the invention.

What is claimed is:

1. A multi-frequency voltage regulating circuit comprising:

a magnetic field converter circuit;

a magnetic field power sensor circuit coupled to the magnetic field converter circuit;

a programmable magnetic field detection circuit coupled to the magnetic field power sensor circuit;

a discharge expediter circuit coupled to the programmable magnetic field detection circuit;

a magnetic field converter circuit;

a rectifier circuit coupled to the magnetic field converter circuit;

a voltage clamping circuit coupled to the magnetic field power sensor circuit and coupled to said rectifier circuit; and a charging circuit coupled to the voltage clamping circuit.

2. The circuit in accordance with claim 1 wherein the charging circuit comprises:

a transistor switch;

a transistor biasing resistor coupled to a gate connector of the transistor switch;

a diode and resistor in parallel coupled to a source connector of the transistor switch;

a battery coupled to the diode and resistor; and an energy storage device coupled to the diode and resistor.

3. The circuit in accordance with claim 1 wherein the voltage clamping circuit comprises:

a zener diode; and a capacitor coupled in parallel to the zener diode.

4. The circuit in accordance with claim 1 for communicating digital data over a magnetic field.

5. The circuit in accordance with claim 1 wherein the magnetic field power sensor circuit comprises:

an input current;

an input current divider circuit coupled to the input current;

an input current multiplier circuit coupled to the input current divider circuit;

a reference current coupled to the input current multiplier circuit; and a comparator coupled to the input current multiplier circuit.

6. The circuit in accordance with claim 5, further comprising a voltage clamping circuit, wherein a source of the input current is an output of the voltage clamping circuit.

7. The circuit in accordance with claim 5 wherein the input current divider circuit comprises at least one divider NMOS transistor.

8. The circuit in accordance with claim 7 wherein:

the gate and drain connectors of each of the at least one divider NMOS transistor are coupled to the input current; and the source connectors of each of the at least one divider NMOS transistor are coupled to a ground reference.

9. The circuit in accordance with claim 5 wherein the input current multiplier circuit comprises at least one multiplier NMOS transistor.

10. The circuit in accordance with claim 9 wherein:

the gate connectors of each of the at least one multiplier NMOS transistor are coupled to the input current divider circuit and to the input current;

the drain connectors of each of the at least one multiplier NMOS transistor are coupled to the reference current; and the source connectors of each of the at least one multiplier NMOS transistor are coupled to a ground reference.

11. The circuit in accordance with claim 5 wherein one input of the comparator is coupled to a voltage induced by the reference current and a second input of the comparator is coupled to a bias voltage source.

12. The circuit in accordance with claim 5 for determining an energy level of an incoming magnetic field by varying at least one of the following parameters:

the reference current;

a current mirror ratio; and a zener diode breakdown voltage.

13. The circuit in accordance with claim 5 wherein the reference current is varied by analog means.

14. The circuit in accordance with claim 5 wherein the reference current is varied by discrete means.

15. The circuit in accordance with claim 1 wherein the programmable magnetic field detection circuit comprises:

a plurality of comparators; and a multiplexer.

16. The circuit in accordance with claim 15 wherein one input of each of the plurality of comparators is coupled to an output of an inductor-capacitor magnetic field converter circuit.

17. The circuit in accordance with claim 16 wherein each output of the plurality of comparators are coupled to inputs of the multiplexer.

18. The circuit in accordance with claim 16 wherein a second input of at least one of the plurality of comparators is coupled to a voltage induced by the reference current.

19. The circuit in accordance with claim 16 wherein a second input of at least one of the plurality of comparators is coupled to a bias voltage source.

20. The circuit in accordance with claim 15 wherein an output of at least one of the plurality of comparators of the programmable magnetic field detection circuit is coupled to an input select of the multiplexer.

21. The circuit in accordance with claim 1 wherein the discharge expediter circuit is comprised of:

a decoder; and at least one discharge path.

22. The circuit in accordance with claim 21 wherein the at least one discharge path is comprised of:

a transistor; and a resistor coupled to the transistor.

23. The circuit in accordance with claim 22 wherein an impedance value of the resistor optimizes the efficiency of the at least one discharge path for a specific magnetic field strength.

24. The circuit in accordance with claim 22 wherein the decoder provides a programmable signal to the transistor for activating the at least one discharge path.

25. The circuit in accordance with claim 21 wherein the expediter circuit provides the at least one discharge path for discharging excess electrical energy induced by a magnetic field.

26. A multi-frequency voltage regulating circuit in accordance with claim 1, wherein said discharge expediter circuit comprises a plurality of discharge paths.

* * * * *